Patented May 9, 1950

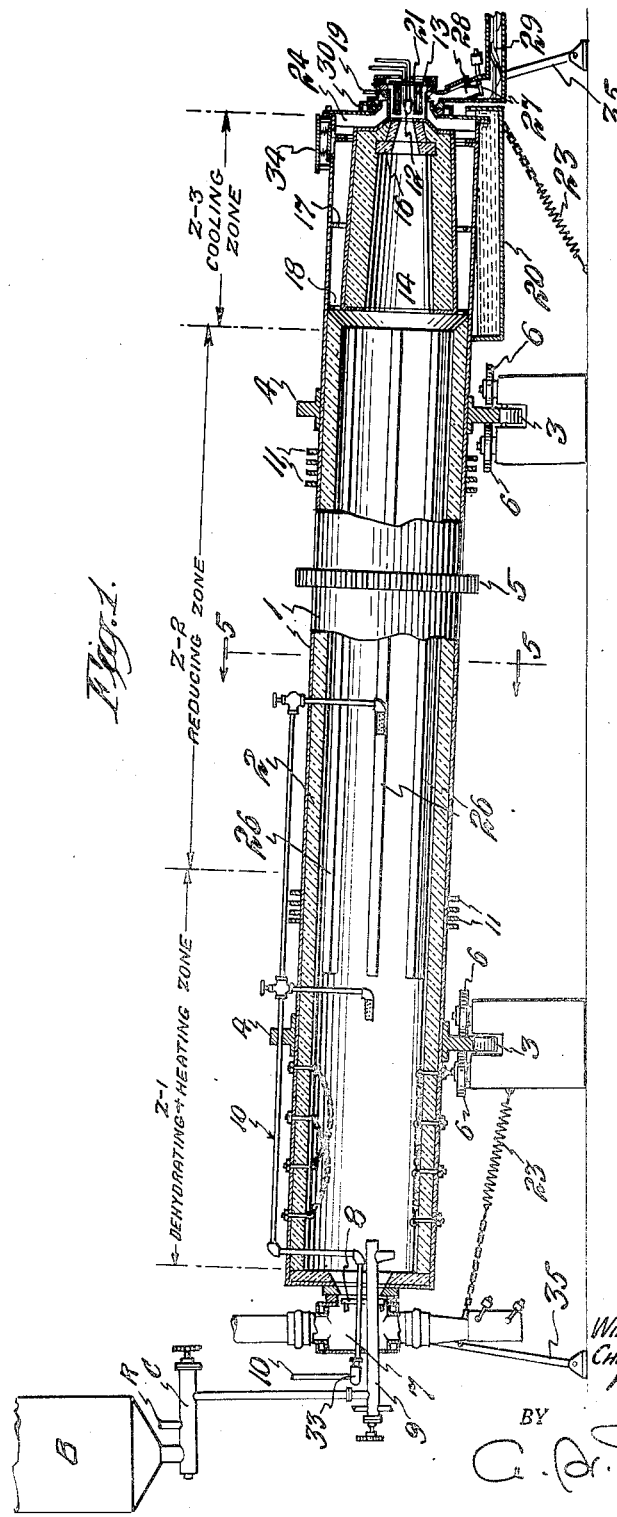

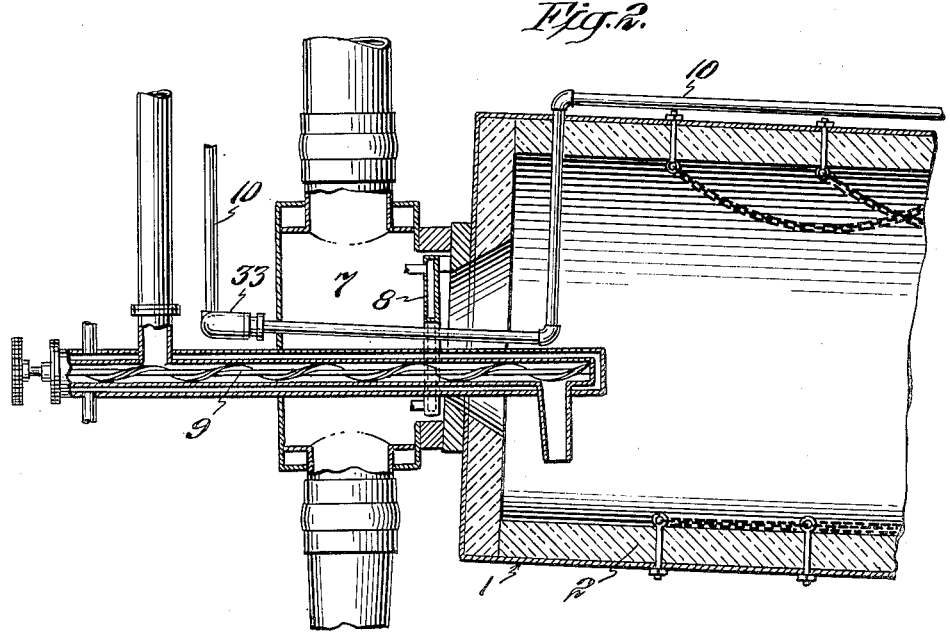
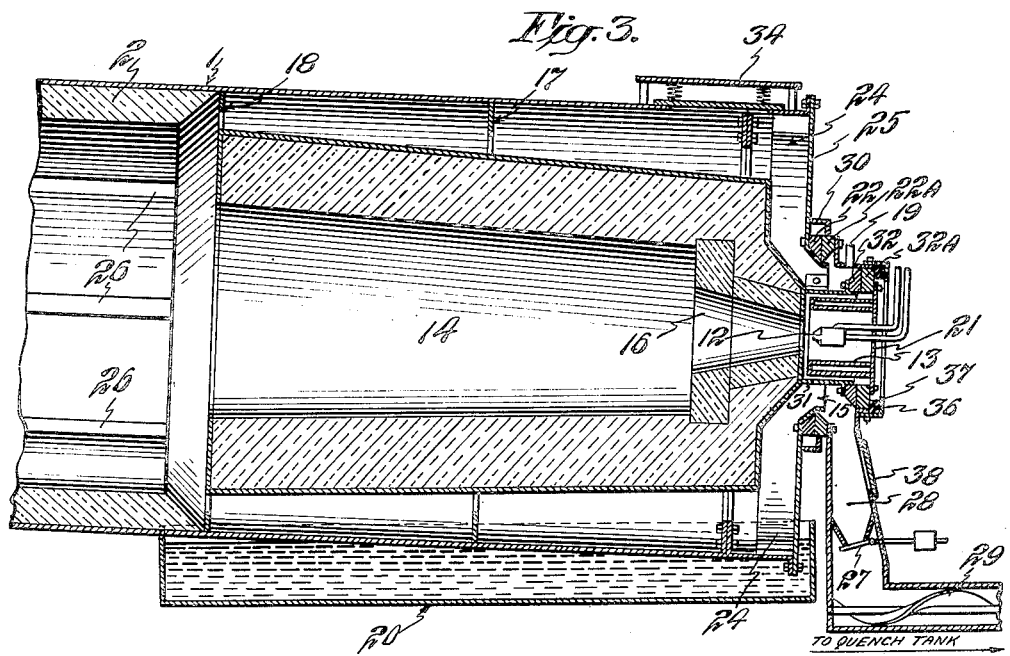

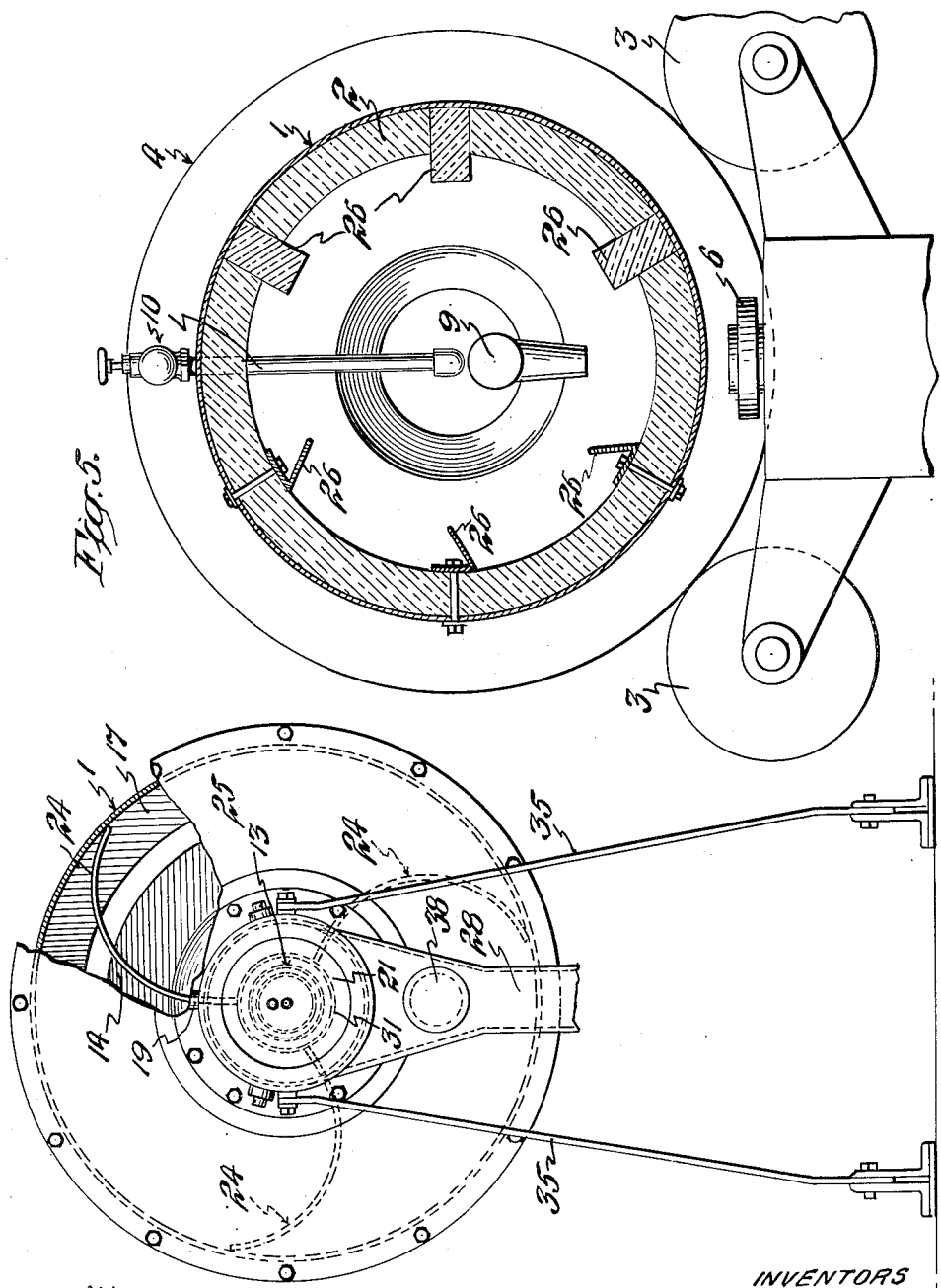

2,507,123

UNITED STATES PATENT OFFICE 2,507,123

ROTARY KILN FOR CHEMICAL AND METALLURGICAL PROCESSES

William Kelvin Sproule and Charles Edward Young, Copper Cliff, and Roy Lincoln Snitch, Coniston, Ontario, Canada, assignors to The International Nickel Company, Inc., New York, N. Y., a corporation of Delaware Application January 17, 1948, Serial No. 2,838 In Venezuela January 31, 1947

6 Claims. (Cl. 23—279)

The present invention relates in general to apparatus for treatment of ores at elevated temperatures and, more particularly, to rotary kilns designed to effect controlled high temperature reduction preparatory to the recovery of nickel from limonitic, silicate and roasted sulphide ores by the ammonia leaching process, and to effect controlled cooling of the heated ores before discharge.

Rotary kilns have long been proposed for the reduction of nickel ores prior to recovery of nickel by the ammonia leaching process. It has been found, however, that the usual types of rotary kiln do not yield satisfactory results, particularly when coal or oil-fired.

The improved rotary kiln embodying the present invention meets the conditions necessary for satisfactory reduction for commercial recovery of nickel by the ammonia leaching process, particularly from lateritic ores containing nickel and cobalt in small amounts, for example, ores of the types found in Venezuela, New Caledonia, the Celebes and Cuba. Such ores contain less than about 5% nickel, variable amounts of iron, silica, magnesia, and combined water of hydration; and are commonly high in free moisture.

The present invention contemplates an improved rotary kiln designed for use with the ammonia leaching process for the recovery of nickel. The ammonia leaching process includes the steps of controlled heating and reducing the ores at elevated temperatures and cooling under controlled conditions. If desired, the reduction can be followed by oxidation and re-reduction at lower temperatures to further improve in economical manner the recovery of nickel from the ores by ammoniacal leaching. A preferred process for utilizing the novel rotary kiln disclosed in the present application is described in the co-pending Queneau, Borland and Renzoni application, Serial No. 778,558, now Patent No. 2,478,942.

In obtaining high nickel recovery in accordance with the present invention, the general procedure first involves the steps of drying the ore and, if the particle size of the ore is too coarse for optimum nickel recovery, then comminuting the ore. If desired, exhaust gases from the reduction kiln can be used for drying. The finely divided ore is then fed to the improved rotary kiln which embodies novel features of construction and arrangements of structural elements contributing to the substantial improvement and efficiency attained by the process while avoiding the objectionable and detrimental conditions such as have been experienced in the use of prior art types of rotary reduction kilns.

It is an object of the present invention to provide a rotary kiln which, particularly in treating low-grade nickel-containing lateritic ores, will result in an output of material wherein a high proportion of the nickel is in a form soluble in ammoniacal leaching solution.

A further object of the improvements contributing to the new results is to provide a novel kiln structure whereby detrimental effects, resulting from contact between incompletely reacted fuel-air mixtures and the ore, are avoided.

Still another object of the invention is to provide a kiln wherein contacts between the ore and harmfully high temperature zones in the flame are avoided.

It is another object of the invention to provide a structure effective in maintaining a positive pressure of gas in the kiln so as to obtain the important advantage of eliminating undesirable air leaks into the kiln or parts thereof, and also to minimize objectionable stratification of gases of different composition in the dehydration and reduction zones of the kiln.

Other objects and advantages of the invention will become apparent from the following description taken in conjunction with the accompanying drawings, in which:

Fig. 1 is a vertical longitudinal section of a rotary kiln embodying the present invention;

Fig. 2 depicts a detailed vertical longitudinal section of the ore-receiving end of the novel rotary kiln illustrated in Fig. 1;

Fig. 3 is a detailed vertical longitudinal section of the ore-discharge end of the novel kiln illustrated in Fig. 1;

Fig. 4 is the end elevation of the ore-discharge end of the kiln with a portion broken away to show the spiral ore-lifters; and Fig. 5 is a section elevation at location 5—5 of the kiln shown in Fig. 1.

Referring more particularly to Fig. 1, the drawing illustrates a rotary tube-type furnace or kiln embodying the present invention. The novel kiln has a steel cylinder or shell 1 which is lined with an insulating, heat-resisting lining 2. The kiln is supported by rolls 3, bearing on riding rings 4 and can be rotated either by rolls 3 if they are powered by rotating drive shaft or by a conventional bull-gear 5. Longitudinal positioning of the kiln can be accomplished by rolls 6 bearing laterally on riding rings 4. Gases from the feed end of the kiln discharge into offtake 7 and then, if required, into conventional dust collecting equipment. Flow of these gases is controlled by an adjustable damper 8 (Figs. 1 and 2) which is maintained in sliding contact with the gas discharge end of the kiln and through which screw conveyor 9 and supplementary air pipe 10 extend. This damper is an important feature of the invention and is preferably adjusted to maintain a positive gas pressure, for example, about 0.05 to about 0.25 inch of water within the kiln to provide a method of excluding air therefrom.

Fig. 2 illustrates in detail a preferred example of the ore-receiving end of the kiln. At the ore-discharge end of the kiln where the rotating shell joins the stationary end housing, shown in Fig. 1 and Fig. 3, gas seals are provided. Use of conventional draft-control dampers in conventional type flues leading from the kiln were found to be unsatisfactory for pressure control. In addition to eliminating undesirable air leaks into the kiln and into the reduced-ore cooler, the novel damper 8, in conjunction with gas seals at the ore-discharge end, minimizes stratification of gases of different compositions in the dehydrating and reduction zones. When such means are not employed, such as is the case with conventional kilns, relatively cool gases, sometimes containing oxygen, flow from the gas discharge housing into the kiln and along the floor of the kiln as far as the reduction zone, with damaging effect on the reduction of the ore. Chains can be used as means to improve heat transfer between gases and ore near the ore-charging end, where use of lifters might result in high dust loss. Sensible heat in the reduced ore can be recovered by use of the heated cooling water, for instance, from spray cooling water or from pan 20, for boiler feed, or by air cooling under induced draft and use of the thus-heated air for fuel combustion purposes. Means provided for temperature control include a multiple point recording pyrometer with thermocouples extending through the kiln wall and connected with copper rings 11 encircling the kiln which are engaged by suitable brushes connected to the pyrometer. Gas is sampled at various points along the kiln and the gases are analyzed automatically for combustibles content. Oxygen in the cooling zone Z—3 or in the subsequent re-reduction and cooling zones of the oxidation-reduction solubility control apparatus, if such is used, is analyzed by means of an instrument sensitive to as little as 0.005% oxygen. As a further feature for obtaining a more effective exposure of ore to the reducing gases in the heating and reduction zones, provision can be made to impart a degree of stirring or lifting or cascading of the ore through the gas by the employment of lifters 26, shown in Figs. 1 and 5, protruding inwardly, for example, about 3 inches to 9 inches from the inner periphery of the kiln. These ore lifters can be made of either brick or heat-resisting alloy steel members designed in correlation with the rotational speed of the kiln and the degree of stirring required.

In general, the length of the kiln, considered with relation to its diameter, rate of ore feed, time necessary to obtain the desired degree of reduction and other variables, is such as to establish, at the elevated, ore-receiving end of the chamber, a drying and heating zone Z—1 communicating with a succeeding reduction zone Z—2 which, in turn, communicates with the final cooling zone Z—3 at the delivery end of the kiln, all three zones being integral. When subsequent oxidation and re-reduction of the reduced ore is practiced, for instance, according to the process disclosed in the co-pending Queneau, Borland and Renzoni application, Serial No. 778,558, the oxidation step may be conducted in the end or cooling zone Z—3 in the kiln, after which the ore is re-reduced and finally cooled in a separate apparatus.

In the operation of the kiln, flow of ore is countercurrent to the flow of the reducing combustion gases resulting from combustion of fuel introduced at the ore-discharge end of the furnace through fuel burner 12 mounted on water-cooled support 13 (Fig. 3). Products from the burner pass into a combustion chamber 14. This combustion chamber or muffle is encircled or surrounded by an extension of the shell 1 in a manner providing a cooling zone or jacket Z—3 for the reduced ore in its passage to an ore discharge port 15. Ignition of the fuel takes place in the usual small ignition muffle or tile 16 integral with chamber 14, after which the ignited fuel and air or oxygen-enriched air enter the novel combustion chamber 14. The combustion chamber is formed of a cylinder of insulating and refractory material supported either within the discharge end of shell 1 or within an extension of shell 1, preferably by means of perforated spacing rings or spacers 17. The entry ports in ring 18 between the reducing zone Z—2 and the cooling zone Z—3, and the perforations in spacing rings 17 are of sufficient size to permit entry of the ore to the annular cooling chamber, passage therethrough and thence to the outgoing ore-discharge port 15. The aforementioned ports in ring 18 are, however, sufficiently small that migration of combustion gases into the cooling chamber can, if desired, be prevented by introduction of a controlled atmosphere into said cooling chamber through gas inlet 19 (Fig. 3). Cooling action at the discharge end of the kiln is provided by water bath 20 or by other suitable means. The annular cooling chamber between the shell and the combustion chamber opens only at the ore-discharge end into discharge port 15, and, at its forward end, only into the reducing zone of the kiln through openings in ring 18, whereby the cooling occurs entirely within a controlled atmosphere.

Other integral or separate coolers, of known designs and permitting cooling of the ore under controlled atmosphere, may be employed in place of the type of cooler described above. Where it is desired to discharge the ore at elevated temperature, for example, into an oxidation-reduction apparatus according to the process disclosed in the co-pending Queneau, Borland and Renzoni application, Serial No. 778,558, the water spray or water bath 20 is not employed and the outer shell surrounding the combustion chamber is lined with refractory insulating material in order to prevent excessive cooling of the ore before discharge into said oxidation-reduction apparatus.

The ore discharge end of the kiln is sealed by discharge housing 21 maintained in sliding contact with the kiln at seal rings 22 and 22A (Fig. 3) by means of tension springs 23 (Fig. 1) or by other suitable means. The discharge housing 21 is supported by pivoted members 35 (Fig. 1). Ore is lifted from the annular space between the combustion chamber 14 and the outer shell 1 by means of spiral lifter blades 24 located between the burner end of the combustion chamber and the kiln end plate 25 (Fig. 3). Spiral ore-lifters 24 lift the ore and discharge it through port 15, from where it falls through seal 27 through a discharge chute 28 to screw conveyor 29 leading to either a quench tank or to other units of equipment for subsequent treatment, such as in the aforementioned oxidation-reduction apparatus. Minor quantities of gas and dust which may leak past seal rings 22 and 22A are removed by suction on a hood 30 (Fig. 3). Passage of gas or ore dust between the discharge housing 21 and the flame issuing from the burner is prevented by extension 31 of the kiln which makes sliding contact with the discharge housing between seal rings 32 and 32A (Fig. 3). Stationary seal ring 32A makes a sliding fit with the stationary discharge housing and is held in contact with moving seal ring 32 by pressure from resilient packing material 36 which in turn is held in place by adjustable angle ring 37. The packing material 36 also functions to prevent gas escape between seal ring 32A and the sleeve of the discharge housing. Limited flexibility is thus provided between stationary seal rings 22A and 32A in order that gas-tight seals can be maintained by pressure between seals 22 and 22A and between seals 32 and 32A. A clean-out and explosion safety door 34 and a discharge chute clean-out port 38 are provided at the discharge end of the kiln.

The finely divided ore for treatment in the novel kiln can be introduced into the kiln by a variety of means. Thus, the ore can be transferred from ore-charging bin B, through an ore-mixing conveyor equipped with a reagent-charging port R to screw conveyor 9 and then to zone Z—1 in the kiln, such as shown in Fig. 1 and, in more detail, in Fig. 2. In the present apparatus, the delivery end of screw conveyor 9 is in close proximity to the inner periphery of the kiln in order that the delivery of the ore thereto be substantially beneath the bed of ore under treatment, thereby reducing dust losses.

The ore introduced in this manner is first heated and dehydrated in the dehydrating and heating zone Z—1 and then is treated within the reducing zone Z—2. Good results are obtainable in this kiln when employing pulverized solid fuel, commercial grades of light or heavy fuel oils, or gas. The novel combustion chamber 14, by virtue of size and shape, provides sufficient flame retention time to permit fuel, introduced through the burner 12, to be thoroughly combusted, to the extent permitted by the proportion of oxygen used, before contact with the ore is made. In this manner, the novel design of combustion chamber is of great value in minimizing contamination of the reduced ore with the products of partial combustion, such as certain hydrocarbons, which are detrimental to the obtaining of best results in the subsequent extraction of nickel. Contact between the reduced ore and uncombined oxygen from the burner air or oxygen is also minimized. Furthermore, overheating of the ore by comparatively high temperature zones in the flame near the burner is avoided. The contour of the inner surface of the novel combustion chamber, combined with its rotating movement, serves to minimize detrimental accumulation of ore particles within the combustion chamber. Combustion of fuel in an external chamber and use of the resulting combustion gases in the kiln involve both the establishment of a separate operation and the inevitable occurrence of heat losses, both of which are avoided by the unitary construction of the present novel kiln. Stationary refractory ignition tile, sometimes used in conjunction with oil and gas burners, are too small to accomplish satisfactorily the desired result. The dimensions of the novel combustion chamber will, of course, vary with the size of the kiln and to some extent with the type of fuel employed. A combustion chamber about 5 feet long and of the proportions illustrated in Fig. 1 has been found satisfactory for a kiln about 50 feet long and about 3 feet inside diameter. In general, for best results, commercial sized kilns require combustion chambers having an internal volume preferably larger than about 50 cubic feet. The improved large rotating combustion chamber or muffle 14 permits maintenance within the kiln of a reducing atmosphere containing up to about 30% by volume of carbon monoxide plus hydrogen, and a ratio of carbon monoxide plus hydrogen to carbon dioxide plus water vapor of more than 2 to 1, when using commercial grades of oil fuel and non-preheated air. This result is accomplished with minimum contamination of the ore by excess combustion products and without interfering with the heating of the ore to the desired temperatures. Regulation of ore retention time is accomplished by controlling the feed rate, kiln slope and rotation rate, and by use of retaining dams or diagonal blading. Kiln sections of enlarged diameter may be used to control retention time of the ore within the kiln. Use of oxygenated or preheated air to support fuel combustion in the novel combustion chamber permits use of still more strongly reducing gases, permits increased nickel recovery and/or permits increased feed rates of the ore through the kiln, and decreases dust losses. The kiln can be provided with means for introducing supplementary air or oxygen for combustion purposes in the dehydrating and heating zone Z—1. Such means are known to those skilled in the art, and can, for instance, be pipe 10, which extends along the kiln a distance usually between one-fourth and one-half the length of the kiln and which permits rapid heating of the ore to the desired reducing temperature range without use of excessive amounts of fuel. The air or oxygen is supplied to pipe 10 by means of rotating joint 33 (Fig. 2). The controlled addition of supplementary air or oxygen also serves to regulate the rate of heating within the range commonly practiced in the reduction of ores. However, such regulation of heating rate is, metallurgically speaking, less important than provision of adequate chemical reaction time in the temperature range of about 1200° F. to about 1600° F. When treating ore low in iron, for example, certain ores, such as those found in Venezuela, it has been discovered that immersing the reduced and cooled ore from the kiln into the leaching solution permits at least 85% nickel recovery from ores containing less than 2.0% nickel. However, the kiln product can, if desired, be treated instead at lower temperatures by a solubility control operation first by partial oxidation and then by re-reduction of the treated ore prior to immersion in leaching solution, such as by the process described in the co-pending Queneau, Borland and Renzoni application, Serial No. 778,558.

As illustrated in Fig. 1, the sections of the kiln defining the dehydrating and heating zone and the reducing zone are lined with insulating brick 2, having a specific gravity of less than about 1.0. Previously, kilns for ore treatment at elevated temperature above 1400° F. have been lined with firebrick (apparent specific gravity about 2.0 to 2.5) or other relatively heavy brick without high insulating qualities. Sometimes a layer of insulating refractory is placed between this inner lining and the steel shell. We have now discovered that particularly when treating lateritic, nickel-containing ores, a better kiln performance as regards heat loss and lining life can be obtained by use of an insulating lining alone, constructed, for example, of porous fireclay brick or castable insulating refractory having an apparent specific gravity of about 0.50 to 1.25. In this manner, the crushing action of a relatively heavy inner lining on an insulating lining is avoided. In addition, the kiln shell, supports and drive may be of lighter, less expensive construction when omitting the heavy refractory lining previously thought necessary in kilns for use at temperatures above about 1200° F. The well-known deformation of circular kiln cross sections under the action of gravity tends to disintegrate refractory linings. The much lighter construction of the present novel kiln decreases any such deformation and, in combination with angle stiffeners on the kiln shell and the annular bearing rings 4, serves to minimize lining disintegration.

Although the present invention has been described in conjunction with a preferred embodiment, it is to be understood that modifications and variations may be resorted to without departing from the spirit and scope of the invention, as those skilled in the art will readily understand. Such variations and modifications as, for instance, the use of the present novel kiln in the treatment of roasted iron sulfide ore containing nickel with or without copper, are to be considered within the purview of the specification and the scope of the appended claims.

We claim:

1. An improved rotary kiln for chemically and metallurgically treating ore comprising a rotatable kiln shell having an ore-charging port at one end, an annular ore-discharging port at the other end, a light-weight, insulating lining of specific gravity between about 0.5 and about 1.25, ore-lifters extending longitudinally along the inner surface of the shell; rolls in external contact with said shell for positioning, supporting and rotating said shell on a central longitudinal axis inclined downwardly toward the annular, ore-discharging end of said shell; a stationary gas-discharge off-take containing a damper maintained in sliding contact with the ore-charging port of said rotatable shell to obtain positive gas pressures between about 0.05 and about 0.25 inch of water in said shell whereby air infiltration and gas stratification are substantially reduced within the kiln; an ore-charging, screw conveyor extending through said gas-discharge off-take, said damper and said ore-charging port into said shell to discharge ore downwardly into said shell near the ore-charging port and in proximity to the lower segment of the inner periphery of said shell; an annular cooling chamber integral with and substantially co-axially aligned with said shell, said annular chamber having an ore-entry port at one end common to the annular ore-discharging port of said shell and having an ore-discharging port provided with spiral, ore-lifting blades; external water sprays for cooling said annular cooling chamber; a combustion chamber integral with and substantially co-axially aligned internally with said shell and said annular cooling chamber by spacers constructed to permit passage of ore through said annular cooling chamber, said combustion chamber opening at one end into said shell at the annular ore-discharging port end thereof, having a burner port at the other end and having an internal volume sufficient to permit complete reaction of all gases contained therein before the reaction products of said gases are discharged into the kiln shell; a stationary ore-discharge housing maintained in sliding, substantially gas-tight contact with said annular cooling chamber to cooperate with said damper in maintaining positive gas pressures and in reducing to a negligible degree air infiltration and gas stratification within the kiln, said ore-discharge housing having a burner substantially co-axially aligned with and directed into the burner port of said combustion chamber, having a port for introducing controlled atmospheres into said annular cooling chamber, and having a substantially gas-tight, ore-discharge chute opening into the ore-discharging port of said annular cooling chamber whereby ore can be treated on a commercial scale in the improved rotary kiln under continuously controlled conditions of temperature and atmosphere to obtain an industrial product having desired chemical and metallurgical characteristics.

2. An improved rotary kiln for chemically and metallurgically treating ore comprising a rotatable kiln shell having an ore-charging port at one end, an annular ore-discharging port at the other end, a light-weight, insulating lining of specific gravity between about 0.5 and about 1.25, ore-lifters extending longitudinally along the inner surface of the shell; a stationary gas-discharge off-take containing a damper maintained in sliding contact with the ore-charging port of said rotatable shell to obtain positive gas pressures in said shell whereby air infiltration and gas stratification are substantially reduced within the kiln; an ore-charging, screw conveyor extending through said gas-discharge off-take, said damper and said ore-charging port into said shell to discharge ore downwardly into said shell near the ore-charging port and in proximity to the lower segment of the inner periphery of said shell; an annular cooling chamber integral with and substantially co-axially aligned with said shell, said annular chamber having an ore-entry port at one end common to the annular ore-discharging port of said shell and having an ore-discharging port provided with spiral, ore-lifting blades; a combustion chamber integral with and substantially co-axially aligned internally with said shell and said annular cooling chamber by spacers constructed to permit passage of ore through said annular cooling chamber, said combustion chamber opening at one end into said shell at the annular ore-discharging port end thereof, having a burner port at the other end and having an internal volume sufficient to permit complete reaction of all gases contained therein before the reaction products of said gases are discharged into the kiln shell; a stationary ore-discharge housing maintained in sliding, substantially gas-tight contact with said annular cooling chamber to cooperate with said damper in maintaining positive gas pressures and in reducing to a negligible degree air infiltration and gas stratification within the kiln, said ore-discharge housing having a burner substantially co-axially aligned with and directed into the burner port of said combustion chamber, having a port for introducing controlled atmospheres into said annular cooling chamber, and having a substantially gas-tight, ore-discharge chute opening into the ore-discharging port of said annular cooling chamber whereby ore can be treated on a commercial scale in the improved rotary kiln under continuously controlled conditions of temperature and atmosphere to obtain an industrial product having desired chemical and metallurgical characteristics.

3. An improved rotary kiln for chemically and metallurgically treating ore comprising a rotatable kiln shell having an ore-charging port at one end, an annular ore-discharging port at the other end, a light-weight, insulating lining; a stationary gas-discharge off-take containing a damper maintained in sliding contact with the ore-charging port of said rotatable shell to obtain positive gas pressures in said shell whereby air infiltration and gas stratification are substantially reduced within the kiln; an ore-charger extending through said gas-discharge off-take, said damper and said ore-charging port; an annular cooling chamber integral with and substantially co-axially aligned with said shell, said annular chamber having an ore-entry port at one end common to the annular ore-discharging port of said shell and having an ore-discharging port; a combustion chamber integral with and substantially co-axially aligned internally with said shell and said annular cooling chamber by spacers constructed to permit passage of ore through said annular cooling chamber, said combustion chamber opening at one end into said shell at the annular ore-discharging port end thereof, having a burner port at the other end and having an internal volume sufficient to permit complete reaction of all gases contained therein before the reaction products of said gases are discharged into the kiln shell; a stationary ore-discharge housing maintained in sliding, substantially gas-tight contact with said annular cooling chamber to cooperate with said damper in maintaining positive gas pressures and in reducing to a negligible degree air infiltration and gas stratification within the kiln, said ore-discharge housing having a burner substantially co-axially aligned with and directed into the burner port of said combustion chamber, having a port for introducing controlled atmospheres into said annular cooling chamber, and having a substantially gas-tight, ore-discharge chute opening into the ore-discharging port of said annular cooling chamber whereby ore can be treated on a commercial scale in the improved rotary kiln under continuously controlled conditions of temperature and atmosphere to obtain an industrial product having desired chemical and metallurgical characteristics.

4. An improving rotary kiln for chemically and metallurgically treating ore comprising a rotatable kiln shell having an ore-charging port at one end, an annular ore-discharging port at the other end, a light-weight, insulating lining of specific gravity between about 0.5 and about 1.25; a damper maintained in sliding contact with the ore-charging port of said rotatable shell to obtain positive gas pressures in said shell whereby air infiltration and gas stratification are substantially reduced within the kiln; an ore-charger extending through said damper and said ore-charging port; an annular cooling chamber integral with and substantially co-axially aligned with said shell, said annular chamber having an ore-entry port at one end common to the annular ore-discharging port of said shell and having an ore-discharging port; a combustion chamber integral with and substantially co-axially aligned internally with said shell and said annular cooling chamber by spacers constructed to permit passage of ore through said annular cooling chamber, said combustion chamber opening at one end into said shell at the annular ore-discharging port end thereof, having a burner port at the other end and having an internal volume sufficient to permit complete reaction of all gases contained therein before the reaction products of said gases are discharged into the kiln shell; a stationary ore-discharge housing maintained in sliding, substantially gas-tight contact with said annular cooling chamber to cooperate with said damper in maintaining positive gas pressures and in reducing to a negligible degree air infiltration and gas stratification within the kiln, said ore-discharge housing having a burner substantially co-axially aligned with and directed into the burner port of said combustion chamber, having a port for introducing controlled atmospheres into said annular cooling chamber, and having a substantially gas-tight, ore-discharge chute opening into the ore-discharging port of said annular cooling chamber whereby ore can be treated on a commercial scale in the improved rotary kiln under continuously controlled conditions of temperature and atmosphere to obtain an industrial product having desired chemical and metallurgical characteristics.

5. An improved rotary kiln for chemically and metallurgically treating ore comprising a rotatable lined kiln shell having an ore-charging port at one end, an annular ore-discharging port at the other end; a damper maintained in sliding contact with the ore-charging port of said rotatable shell to obtain positive gas pressures in said shell whereby air infiltration and gas stratification are substantially reduced within the kiln; an ore-charger extending through said damper and said ore-charging port; an annular cooling chamber integral with and substantially co-axially aligned with said shell, said annular chamber having an ore-entry port at one end common to the annular ore-discharging port of said shell and having an ore-discharging port; a combustion chamber integral with and substantially co-axially aligned internally with said shell and said annular cooling chamber by spacers constructed to permit passage of ore through said annular cooling chamber, said combustion chamber opening at one end into said shell at the annular ore-discharging port end thereof, having a burner port at the other end and having an internal volume sufficient to permit complete reaction of all gases contained therein before the reaction products of said gases are discharged into the kiln shell; a stationary ore-discharge housing maintained in sliding, substantially gas-tight contact with said annular cooling chamber to cooperate with said damper in maintaining positive gas pressures and in reducing to a negligible degree air infiltration and gas stratification within the kiln, said ore-discharge housing having a burner substantially co-axially aligned with and directed into the burner port of said combustion chamber, having a port for introducing controlled atmospheres into said annular cooling chamber, and having a substantially gas-tight, ore-discharge chute opening into the ore-discharging port of said annular cooling chamber whereby ore can be treated on a commercial scale in the improved rotary kiln under continuously controlled conditions of temperature and atmosphere to obtain an industrial product having desired chemical and metallurgical characteristics.

6. An improved rotary kiln for chemically and metallurgically treating ore comprising a rotatable lined kiln shell having an ore-charging port at one end, an annular ore-discharging port at the other end; a damper maintained in sliding contact with the ore-charging port of said rotatable shell to obtain positive gas pressures in said shell whereby air infiltration and gas stratification are substantially reduced with the kiln; an ore-charger extending through said damper and said ore-charging port; an annular cooling chamber integral with and substantially co-axially aligned with said shell, said annular chamber having an ore-entry port at one end common to to the annular ore-discharging port of said shell and having an ore-discharging port; a combustion chamber integral with and substantially co-axially aligned internally with said shell and said said annular cooling chamber by spacers constructed to permit passage of ore through said annular cooling chamber, said combustion chamber opening at one end into said shell at the annular ore-discharging port end thereof, having a burner port at the other end and having an internal volume sufficient to permit complete reaction of all gases contained therein before the reaction products of said gases are discharged into the kiln shell; a stationary ore-discharge housing maintained in sliding, substantially gastight contact with said annular cooling chamber to cooperate with said damper in maintaining positive gas pressures and in reducing to a negligible degree air infiltration and gas stratification within the kiln, said ore-discharge housing having a burner substantially co-axially aligned with and directed into the burner port of said combustion chamber, and having a substantially gastight, ore-discharge chute opening into the ore-discharging port of said annular cooling chamber whereby ore can be treated on a commercial scale in the improved rotary kiln under continuously controlled conditions of temperature and atmosphere to obtain an industrial product having desired chemical and metallurgical characteristics.

WILLIAM KELVIN SPROULE.
CHARLES EDWARD YOUNG.
ROY LINCOLN SNITCH.

REFERENCES CITED

The following references are of record in the file of this patent:

UNITED STATES PATENTS

| Number | Name | Date |
|---|---|---|
| 1,000,267 | Jackson | Aug. 8, 1911 |
| 1,171,583 | Benson | Feb. 15, 1916 |
| 1,510,140 | Fasting | Sept. 30, 1924 |
| 1,754,854 | Gelstharp | Apr. 15, 1930 |
| 2,173,182 | Ronne | Sept. 19, 1939 |

Certificate of Correction

May 9, 1950

Patent No. 2,507,123

WILLIAM KELVIN SPROULE ET AL.

It is hereby certified that error appears in the printed specification of the above numbered patent requiring correction as follows:

Column 11, line 6, for the word "with" read *within*;

and that the said Letters Patent should be read with this correction therein that the same may conform to the record of the case in the Patent Office.

Signed and sealed this 15th day of August, A. D. 1950.

[SEAL]

THOMAS F. MURPHY,
*Assistant Commissioner of Patents.*